United States Patent
Lin et al.

(10) Patent No.: US 7,170,720 B2
(45) Date of Patent: Jan. 30, 2007

(54) CPP READ HEAD FOR HIGH DENSITY AND SHIELD NOISE SUPPRESSION

(75) Inventors: Charles C. Lin, San Jose, CA (US); Min Li, Fremont, CA (US); Simon Liao, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 570 days.

(21) Appl. No.: 10/650,602

(22) Filed: Aug. 28, 2003

(65) Prior Publication Data

US 2005/0047025 A1    Mar. 3, 2005

(51) Int. Cl.
*G11B 5/39* (2006.01)

(52) U.S. Cl. ..................... 360/319

(58) Field of Classification Search ............ None
See application file for complete search history.

(56) References Cited

U.S. PATENT DOCUMENTS

| | | | |
|---|---|---|---|
| 5,784,224 A | 7/1998 | Rottmayer et al. | 360/113 |
| 5,959,811 A | 9/1999 | Richardson | 360/113 |
| 6,396,670 B1 * | 5/2002 | Murdock | 360/319 |
| 6,469,879 B1 | 10/2002 | Redon et al. | 360/324.2 |
| 6,473,279 B2 | 10/2002 | Smith et al. | 360/324.12 |
| 6,496,335 B2 * | 12/2002 | Gill | 360/319 |
| 6,515,573 B1 | 2/2003 | Dong et al. | 338/32 R |

\* cited by examiner

*Primary Examiner*—R. S. Tupper
(74) *Attorney, Agent, or Firm*—Saile Ackerman LLC; Stephen B. Ackerman

(57) ABSTRACT

It is known that the magnetic shields, between which CPP GMR stacks are sandwiched, can be a source of AMR (anisotropic magneto-resistance) noise. This has been significantly reduced by coating both the magnetic shields with highly conductive layers. If the guidelines disclosed in the invention are followed, the read head can exhibit AMR noise reduced by about 14 to 20. Additionally, the total thickness of the read gap can be maintained to be as low as 300 to 400 Angstroms.

32 Claims, 2 Drawing Sheets

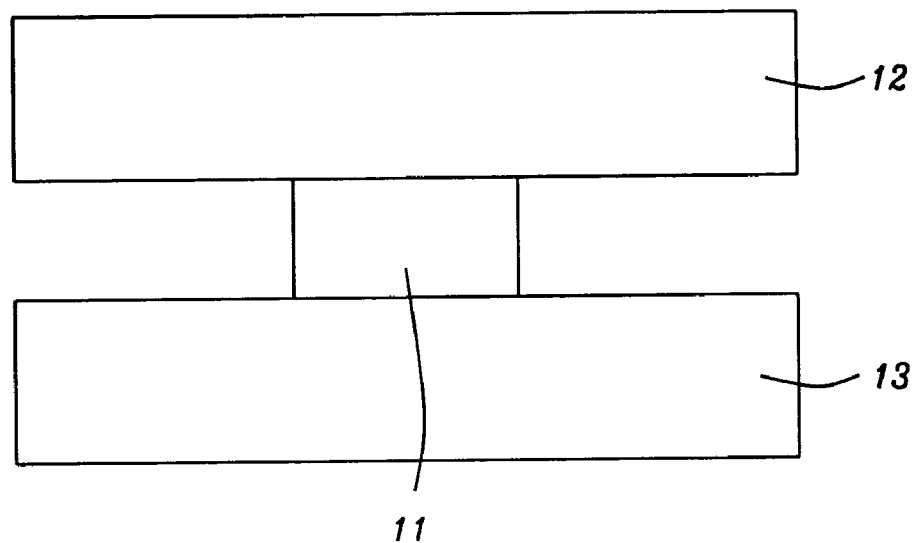
*FIG. 1 - Prior Art*
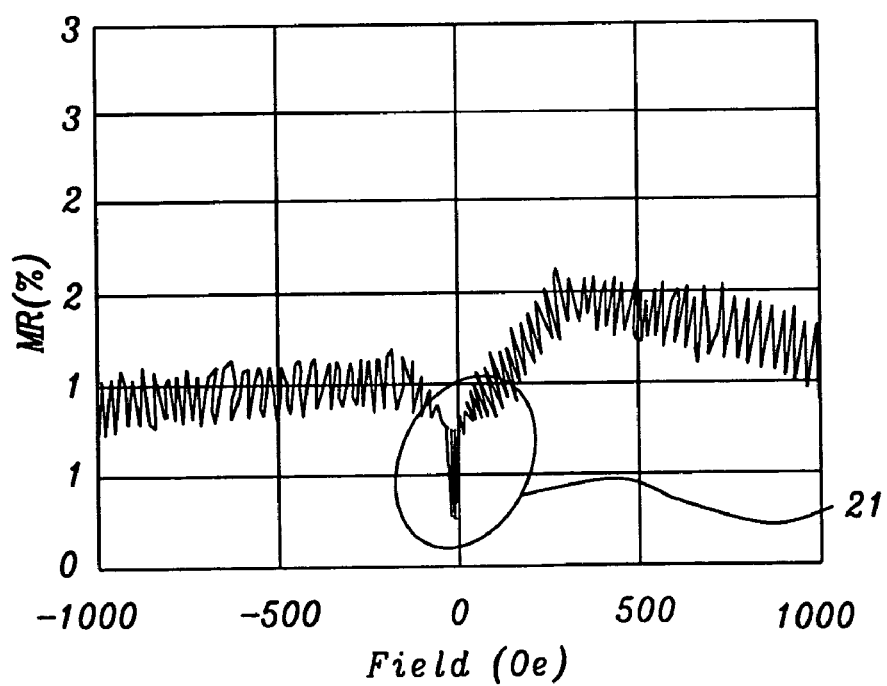
*FIG. 2 - Prior Art*

CPP READ HEAD FOR HIGH DENSITY AND SHIELD NOISE SUPPRESSION

FIELD OF THE INVENTION

The invention relates to the general field of magnetic read heads with particular reference to suppression of noise due to AMR (anisotropic magneto-resistance).

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

GMR stack 11 is schematically shown in FIG. 1. Its key elements (not shown) are an antiferromagnetic layer whose purpose is to act as a pinning agent for a magnetically pinned layer. Lying on the latter is a copper spacer layer on which there is a low coercivity (free) ferromagnetic layer. Magnetic shield layers 12 and 13 lie immediately above and below the spin valve and serve to block out external magnetic influences that might upset the operation of the unit, while leaving it free to interact with magnetic fields above the plane of the figure (i.e. from the storage media).

When the free layer is exposed to an external magnetic field, the direction of its magnetization is free to rotate according to the direction of the external field. The magnetization of the free layer will be in a direction dictated by the minimum energy state. This, in turn, is determined by a number of factors including the crystalline and shape anisotropies.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a CIP spin valve is typically 8–20% while for a CPP SV this value can be over 60%.

Most GMR devices have been designed so as to measure the resistance of the free layer for current flowing parallel to its two surfaces. However, as the quest for ever greater densities has progressed, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible. In contrast, in a CPP device, the total transverse resistance of all layers, other than the free layer, should be as low as possible so that resistance changes in the free layer can dominate.

Since the two shields, 12 and 13, are made of soft magnetic materials they will sense the bit fields from the disk media by its AMR effect as sense current flow ($\Delta R_{AMR}$) in the shields. $\Delta R_{AMR}$ constitutes noise that is super-imposed on the GMR signal. This phenomenon is illustrated in FIG. 2, where an R-H curve of a CPP shield is shown. Note the portion within circle 21. The part of the curve near zero field that has gone negative represents AMR pickup by the shield.

It is the purpose of the present invention to reduce this noise by 5 to 10 times. A method for achieving this is disclosed below.

A routine search of the prior art was performed with the following references of interest being found:

In U.S. Pat. No. 6,515,573, Bong et al. describe a small free layer resulting in reduced noise. Smith et al. discuss noise in the free layer in U.S. Pat. No. 6,473,279. U.S. Pat. No. 6,469,879 (Redon et al) shows that noise occurs if the free layer is too thin. U.S. Pat. No. 5,959,811 (Richardson) discloses noise current in the leads while Rottmayer et al. teach a configuration to reduce noise in the read signal in U.S. Pat. No. 5,784,224.

SUMMARY OF THE INVENTION

It has been an object of at least one embodiment of the present invention to provide a CPP GMR magnetic read head.

Another object of at least one embodiment of the present invention has been that said read head exhibit AMR noise less than about 14 to 20 db.

Still another object of at least one embodiment of the present invention has been to provide a process for manufacturing said read head.

Yet another object of at least one embodiment of the present invention has been to provide a structure that can maintain a very narrow band gap.

These objects have been achieved by coating the upper and lower magnetic shields of the read head with highly conductive layers. If the guidelines disclosed in the invention are followed, these objects can be met.

BRIEF DESCRIPTION OF THE DRAWINGS

FIG. 1 shows a conventional CPP GMR unit placed between two magnetic shields.

FIG. 2 is an R-H curve of a CPP head with magnetic shield

DESCRIPTION OF THE PREFERRED EMBODIMENTS

Figure 3:
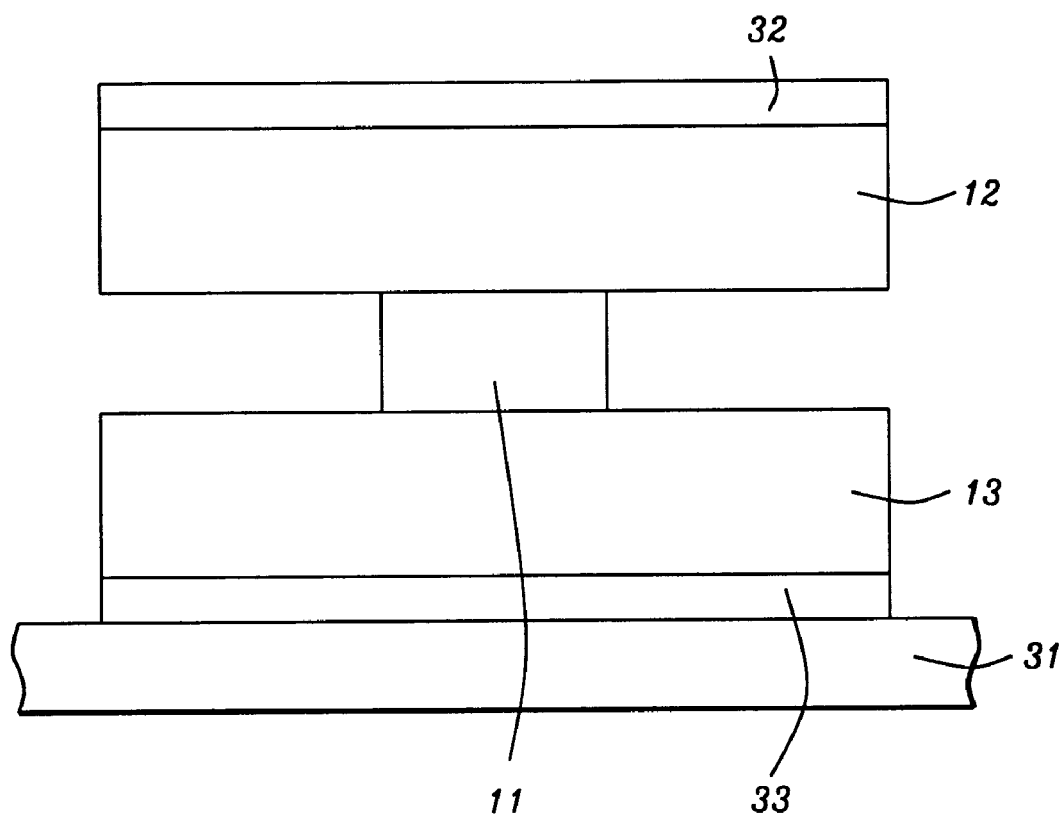
FIG. 3 is a CPP GMR structure whose shields have been modified in accordance with the present invention.

As noted earlier, the present invention shows how shield noise may be reduced by a factor of 5 to 10. We achieve this by adding highly conductive layers to both shields and, then, bypassing most of the current that normally flows inside the shield. Said bypass conductors are added at each shield's outside face. This allows the read gap tp be made very narrow and can obtain a narrow pulse width ($PW_{50}$) to achieve higher BPI We will disclose the present invention through a description of a process for its manufacture. Said description will also make clear the structure of the present invention.

Referring now to FIG. 3, the process begins with the provision of substrate 31 on which is deposited lower conductive layer 33. This is followed by the deposition (on layer 33) of lower magnetic shield layer 13. A key feature of the invention is that layer 13 must have an electrical resistance (parallel to the plane of the substrate) that is between about 5 and 10 times the in-plane resistance of lower conductive layer 33.

CPP GMR stack 11 is now formed on lower magnetic shield 13. Note that stack 11 is actually surrounded by insulation (not shown) that will serve to support any subsequently deposited layers.

Next, upper magnetic shield layer 12 is deposited on CPP GMR stack 11 followed by the deposition (on upper magnetic shield 12) of upper conductive layer 32. Another key feature of the invention is that layer 32 must have an electrical resistance that is between about 0.2 and 0.1 times the in-plane resistance of layer 12.

Typical materials used for the magnetic shields include (but are not limited to) NiFe, CoZrNb, FeAlSi, NiFeCr, NiFe, and Ta. It is important to note that not all these materials would be considered as suitable candidates for magnetic shielding in prior art structures because of their relatively high resistivity. Similarly, shields used by the prior art need to be at least 2 microns thick in order to keep their in-plane resistance as low as possible. Shields used in accordance with the present invention may have thicknesses between about 1 and 3 microns. Thus, the in-plane sheet resistance of each magnetic shield may be anywhere in the range of from about 0.15 to about 0.45 ohms per square Suitable materials for lower conductive layer 33 include (but are not limited to) Cu, Al, Au, and Ag while for upper conductive layer 32 suitable materials include (but are not limited to) Cu, Al, Au, and Ag. Note that it is not required that layers 32 and 33 be of the same material, particularly in situations where it would be advantageous for them to be of different materials.

In general, lower conductive layer 33 will have a resistivity between about 2 and 10 microhm-cm and will be deposited to a thickness between about 0.5 and 5 microns. Similarly (but not necessarily identically) upper conductive layer 32 will have a resistivity between about 2 and 10 microhm-cm and will be deposited to a thickness between about 0.5 and 5 microns.

If the guide-lines disclosed above are followed, the resulting structure will exhibit AMR noise that has been reduced by 14 to 20 dB.

What is claimed is:

1. A method to suppress AMR noise from a magnetic shield having a resistance and a first surface that opposes a CPP GMR device, comprising:
    coating a second surface of said shield, that opposes said first surface, with a layer of conductive material having a resistance, parallel to said first surface, that is between about 0.2 and 0.1 times said magnetic shield resistance.

2. The method recited in claim 1 wherein said magnetic shield is NiFe, CoZrNb, NiFeCr, NiFeTa, or FeAlSi.

3. The method recited in claim 1 wherein said magnetic shield has a sheet resistance i8s between about 0.15 and 0.45 ohms per square.

4. The method recited in claim 1 wherein said layer of conductive material is Cu, Al, Au, or Ag.

5. The method recited in claim 1 wherein said layer of conductive material has a resistivity between about 2 and 10 microhm-cm.

6. The method recited in claim 1 wherein said layer of conductive material is deposited to a thickness between about 0.5 and 5 microns.

7. A magnetic shield structure comprising:
    a magnetic shield having the form of a layer having a resistance and a first surface that opposes a CPP GMR device; and
    on an opposing second surface of said magnetic shield, a layer of conductive material having a resistance, parallel to said surface, that is between about 0.2 and 0.1 times said magnetic shield resistance.

8. The magnetic shield described in claim 7 wherein said magnetic shield is NiFe, CoZrNb, NiFeCr, NiFeTa, or FeAlSi.

9. The magnetic shield described in claim 7 wherein each of said magnetic shields has a sheet resistance between about 0.15 and 0.45 ohms per square.

10. The magnetic shield described in claim 7 wherein said layer of conductive material is Cu, Al, Au, or Ag.

11. The magnetic shield described in claim 7 wherein said layer of conductive material has a resistivity between about 2 and 10 microhm-cm.

12. The magnetic shield described in claim 7 wherein said layer of conductive material has a thickness between about 0.5 and 5 microns.

13. A process to manufacture a CPP GMR magnetic read head, having low AMR noise, comprising:
    providing a substrate;
    depositing on said substrate a lower conductive layer, having a resistance in the plane of the substrate;
    depositing on said lower conductive layer a lower magnetic shield layer having a resistance that is between about 5 and 10 times said in-plane resistance of said lower conductive layer;
    forming a CPP GMR stack on said lower magnetic shield;
    depositing on said CPP GMR stack an upper magnetic shield layer having a resistance in the plane of the substrate; and
    depositing on said upper magnetic shield layer an upper conductive layer having a resistance that is between about 0.2 and 0.1 times said in-plane resistance of said upper magnetic shield.

14. The process recited in claim 13 wherein said magnetic shields are NiFe, CoZrNb, NiFeCr, NiFeTa, or FeAlSi.

15. The process recited in claim 13 wherein each of said magnetic shields has a sheet resistance between about 0.15 and 0.45 ohms per square.

16. The process recited in claim 13 wherein said lower conductive layer is Cu, Al, Au, or Ag.

17. The process recited in claim 13 wherein said lower conductive layer has a resistivity between about 2 and 10 microhm-cm.

18. The process recited in claim 13 wherein said lower conductive layer is deposited to a thickness between about 0.5 and 5 microns.

19. The process recited in claim 13 wherein said upper conductive layer is Cu, Al, Au, or Ag.

20. The process recited in claim 13 wherein said upper conductive layer has a resistivity between about 2 and 10 microhm-cm.

21. The process recited in claim 13 wherein said upper conductive layer is deposited to a thickness between about 0.5 and 5 microns.

22. A CPP GMR read head having low AMR noise, comprising:
    on said substrate, a lower conductive layer, having a resistance in the plane of the substrate;
    on said lower conductive layer a lower magnetic shield layer having a resistance that is between about 5 and 10 times said in-plane resistance of said lower conductive layer;
    a CPP GMR stack on said lower magnetic shield;
    on said CPP GMR stack, an upper magnetic shield layer having a resistance in the plane of the substrate; and on said upper magnetic shield layer, an upper conductive layer having a resistance that is between about 0.2 and 0.1 times said in-plane resistance of said upper magnetic shield.

23. The read head described in claim 22 wherein said magnetic shields are NiFe, CoZrNb, NiFeCr, NiFeTa, or FeAlSi.

24. The read head described in claim 22 wherein each magnetic shield has a sheet resistance of between about 0.15 and 0.45 ohms per square.

25. The read head described in claim 22 wherein said lower conductive layer is Cu, Al, Au, or Ag.

26. The read head described in claim 22 wherein said lower conductive layer has a resistivity between about 2 and 10 microhm-cm.

27. The read head described in claim 22 wherein said lower conductive layer has a thickness between about 0.5 and 5 microns.

28. The read head described in claim 22 wherein said upper conductive layer is Cu, Al, Au, or Ag.

29. The read head described in claim 22 wherein said upper conductive layer has a resistivity between about 2 and 10 microhm-cm.

30. The read head described in claim 22 wherein said upper conductive layer has a thickness between about 0.5 and 5 microns.

31. The read head described in claim 22 wherein said upper and lower shields are separated by no more than 0.08 microns.

32. The read head described in claim 22 wherein AMR noise is reduced by 14 –20dB.

* * * * *